United States Patent
Chang et al.

(10) Patent No.: US 7,301,525 B2
(45) Date of Patent: Nov. 27, 2007

(54) COORDINATE POSITIONING DEVICE AND METHOD THEREOF

(75) Inventors: Wei-Chih Chang, Sindian (TW); Wei-Chian Wang, Sindian (TW); Chia-Wei Chen, Sindian (TW)

(73) Assignee: High Tech Computer Corp., Taoyuan (TW)

( * ) Notice: Subject to any disclaimer, the term of this patent is extended or adjusted under 35 U.S.C. 154(b) by 693 days.

(21) Appl. No.: 10/803,855

(22) Filed: Mar. 18, 2004

(65) Prior Publication Data

US 2005/0088406 A1    Apr. 28, 2005

(30) Foreign Application Priority Data

Oct. 24, 2003    (TW) .............................. 92129685 A

(51) Int. Cl.
*G09G 5/00*    (2006.01)
(52) U.S. Cl. .................. 345/156; 345/173; 178/18.01; 178/18.05
(58) Field of Classification Search ................ 345/156, 345/173; 178/18.01–18.05
See application file for complete search history.

(56) References Cited

U.S. PATENT DOCUMENTS

| | | | |
|---|---|---|---|
| 5,053,757 A * | 10/1991 | Meadows .................... 345/173 |
| 5,831,599 A | 11/1998 | Inoue .......................... 345/173 |
| 6,366,866 B1 | 4/2002 | Kanagawa et al. ........... 702/95 |
| 6,411,278 B1 * | 6/2002 | Kage et al. .................. 345/158 |
| 6,610,936 B2 * | 8/2003 | Gillespie et al. ......... 178/18.01 |
| 6,657,615 B2 * | 12/2003 | Harada ........................ 345/173 |
| 2002/0044137 A1 * | 4/2002 | Kim ............................ 345/173 |
| 2003/0206162 A1 * | 11/2003 | Roberts ....................... 345/173 |

* cited by examiner

*Primary Examiner*—Amare Mengistu
*Assistant Examiner*—Emmanuel Hailemariam
(74) *Attorney, Agent, or Firm*—Thomas, Kayden, Horstemeyer & Risley

(57) ABSTRACT

A coordinate positioning device and the method thereof for detecting the coordinate of a contact point even in an environment of periodic noises. Firstly, obtain a first and a second sampling values of the contact point at a first and a second time points, respectively. Next, determine if the absolute value of the difference between the first and the second sampling values is smaller than a first threshold value. If not, neglect this contact point; if yes, obtain a third sampling value of the contact point at a third time point. Lastly, determine if the absolute value of the difference between the first sampling value and the third sampling value is smaller than a second threshold value or not: if not, neglect this contact point; if yes, use the average value of the first and second sampling values to obtain the coordinate value of the contact point.

12 Claims, 5 Drawing Sheets

COORDINATE POSITIONING DEVICE AND METHOD THEREOF

This application claims the benefit of Taiwan application Serial No. 092129685, filed Oct. 24, 2003, the subject matter of which is incorporated herein by reference.

BACKGROUND OF THE INVENTION

1. Field of the Invention

The invention relates in general relates to a coordinate positioning device and the method thereof, and more particularly, to an anti-noise coordinate positioning device and the method thereof.

2. Description of the Related Art

Coordinate positioning devices are widely applied in man-machine interface to facilitate the communication between the user and the electronic product. The coordinate positioning device, such as a mouse or a film positioning device for instance, detects the position and further has the position indicated on the screen by means of a cursor. The film positioning device, which includes two pieces of resistance-type films or capacitance-type films, detects the coordinates of the contact point touched by the user.

Referring to FIG. 1, a circuit diagram of a resistance-type film positioning device. Resistance-type film positioning device 100 includes a thin film 110. The thin film 110 further includes a thin film X and a thin film Y, wherein the thin film X and the thin film Y are plane resistances and have not any mutual contact in natural status. The resistance value on the thin film X changes along with the change of X-coordinate, not with the change of Y-coordinate, while the resistance value on the thin film Y changes along with the change of Y-coordinate, not with the change of X-coordinate. The thin film positioning device further includes transistors QX0, QX1, QY0, and QY1 as well as capacitances Cxp, Cxm, Cyp, and Cym for detecting the contact points and isolating the noises thereof. Of which, transistors QX0, QX1, QY0, and QY1 are controlled by signals X0, X1, Y0, and Y1.

When the user touches the film positioning device 100, the thin film X and the thin film Y will be connected at a contact point whose resistance is R_touch. On the thin film X, the resistance at points above the contact point is R_up, while the resistance at points below the contact point is R_down. On the thin film Y, the resistance at points to the left of the contact point is R_left, while the resistance at points to the right of the contact point is R_right. The thin film positioning device 100 will obtain the Y-coordinate of the contact point according to the ratio between R_up and R_down, and will obtain the X-coordinate of the contact point according to the ratio between R_right and R_left.

FIG. 2A is an equivalent circuit diagram for a thin film positioning device when detecting the X-coordinate of the contact point. When detecting the X-coordinate of the contact point, transistors QY0 and QY1 are switched on, allowing an electric current I1 to reach the ground via QY1, R_left, R_right, and QY0 in succession. After measuring the voltage at point XP, the ration between R_left and R_right will be obtained whereby the X-coordinate of the contact point can be obtained accordingly. Besides, the X-coordinate of the contact point can also be obtained after measuring the voltage at point XM.

FIG. 2B is an equivalent circuit diagram for a thin film positioning device when detecting the Y-coordinate of the contact point. When detecting the Y-coordinate of the contact point, transistors QX0 and QX1 are switched on, allowing an electric current I2 to reach the ground via QX1, R_up, R_down, and QX0 in succession. After measuring the voltage at point YP, the ration between R_up and R_down will be obtained whereby the Y-coordinate of the contact point can be obtained accordingly. Besides, the Y-coordinate at the contact point can also be obtained after measuring the voltage at point YM.

When applied in an electronic device, a thin film positioning device is likely to be coupled to plenty of noises which will cause errors to the coordinates obtained. For example, despite the user presses at the same contact point, however, due to the interference of the noise, the obtained coordinates of the contact point may be changeable. The general practice is to have multiple samplings of the contact point, say, 8 samplings, within a specific period of time, then use the average values of the 8 samplings as the coordinates of the contact point. However, using multiple sampling to determine the coordinates of the contact point is both time-consuming and energy consuming.

SUMMARY OF THE INVENTION

It is therefore an object of the invention to provide a noise canceling coordinate positioning device and the method thereof.

According to the object of the invention, a positioning method is provided to be applied in a thin film positioning device for detecting the coordinates of a contact point even in an environment of periodic noises. The steps of the positioning method are disclosed below. Firstly, obtain a first sampling value of the contact point at a first time point and a second sampling value of the contact point at a second time point in succession. Next, determine if the absolute value of the difference between the first sampling value and the second sampling value is smaller than a first threshold value or not. If not, neglect this contact point and end the process of this method; if yes, obtain a third sampling value of the contact point at a third time point. Lastly, determine if the absolute value of the difference between the first sampling value and the third sampling value is smaller than a second threshold value or not: if not, neglect this contact point and end the process of this method; if yes, use the average values of the first sampling value and the second sampling value to obtain the coordinates of the contact point.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 3:
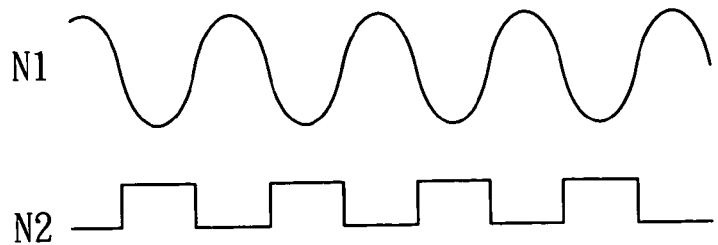
FIG. 3 is a schematic diagram of periodic noises.

When applied in an electronic device, a thin film positioning device is likely to be coupled to plenty of noises which will cause errors to the coordinates obtained. These noises are periodic. Take the thin film positioning device disposed on the touch panel of a personal digital assistant (PDA) for example. The liquid crystal display screen has high-frequency signals such as pixel clock signal, horizontal synchronization signals, and vertical synchronization signal to maintain an updating frequency of 30 frames per second. According to actual observation, these high-frequency signals will become periodic noises when coupled to an electric device. FIG. 3 is a schematic diagram of periodic noises. When detecting the coordinates of the contact point, the film positioning device 100 of an electronic device are likely to be coupled to noises such as sine wave noises N1 or square wave noises N2. The thin film positioning device according to the invention can promptly and precisely position the coordinates of the contact point under the circumstance of periodic noises.

Figure 1:
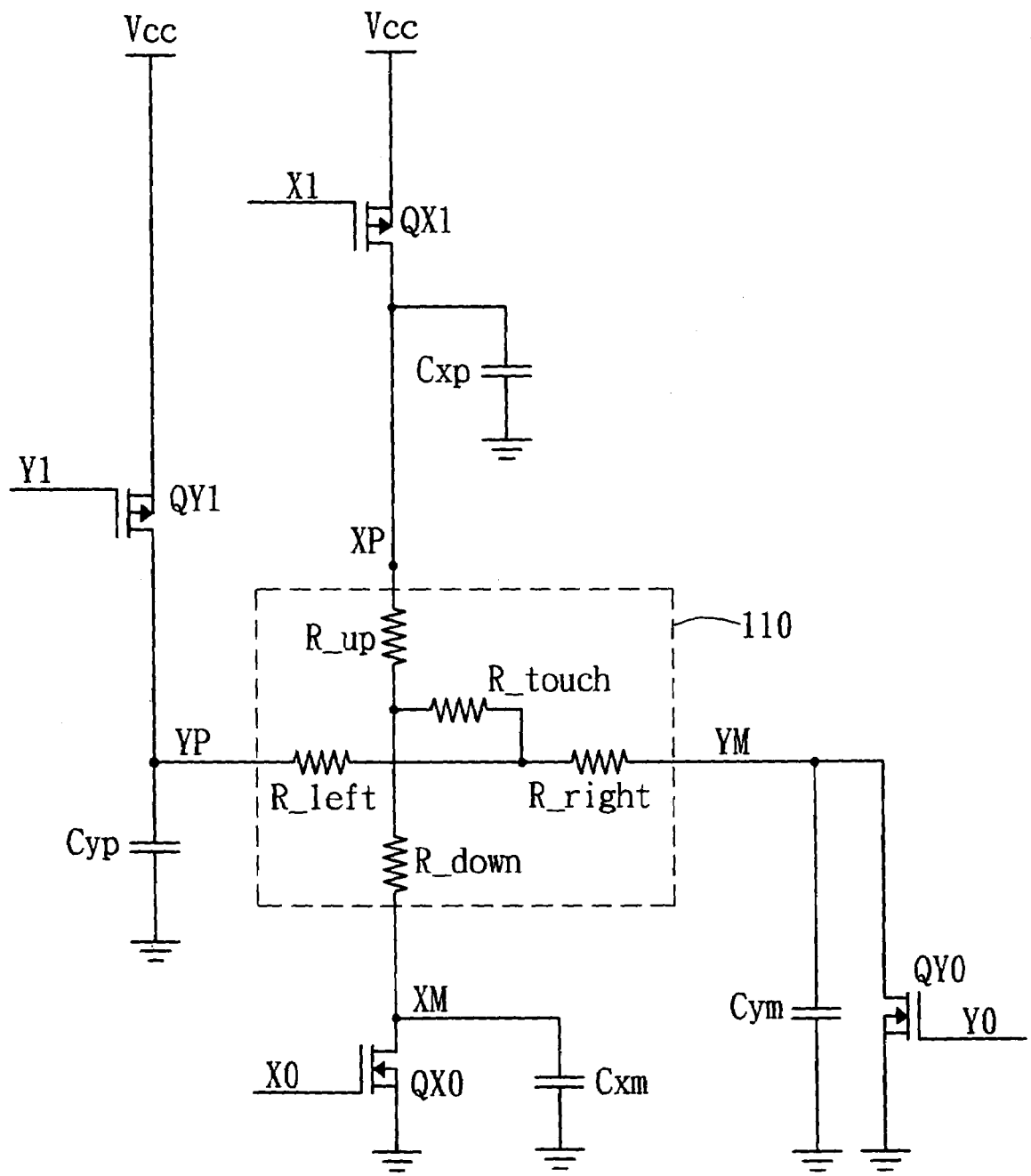
FIG. 1 is a circuit diagram of a resistance-type film positioning device.
Figure 4:
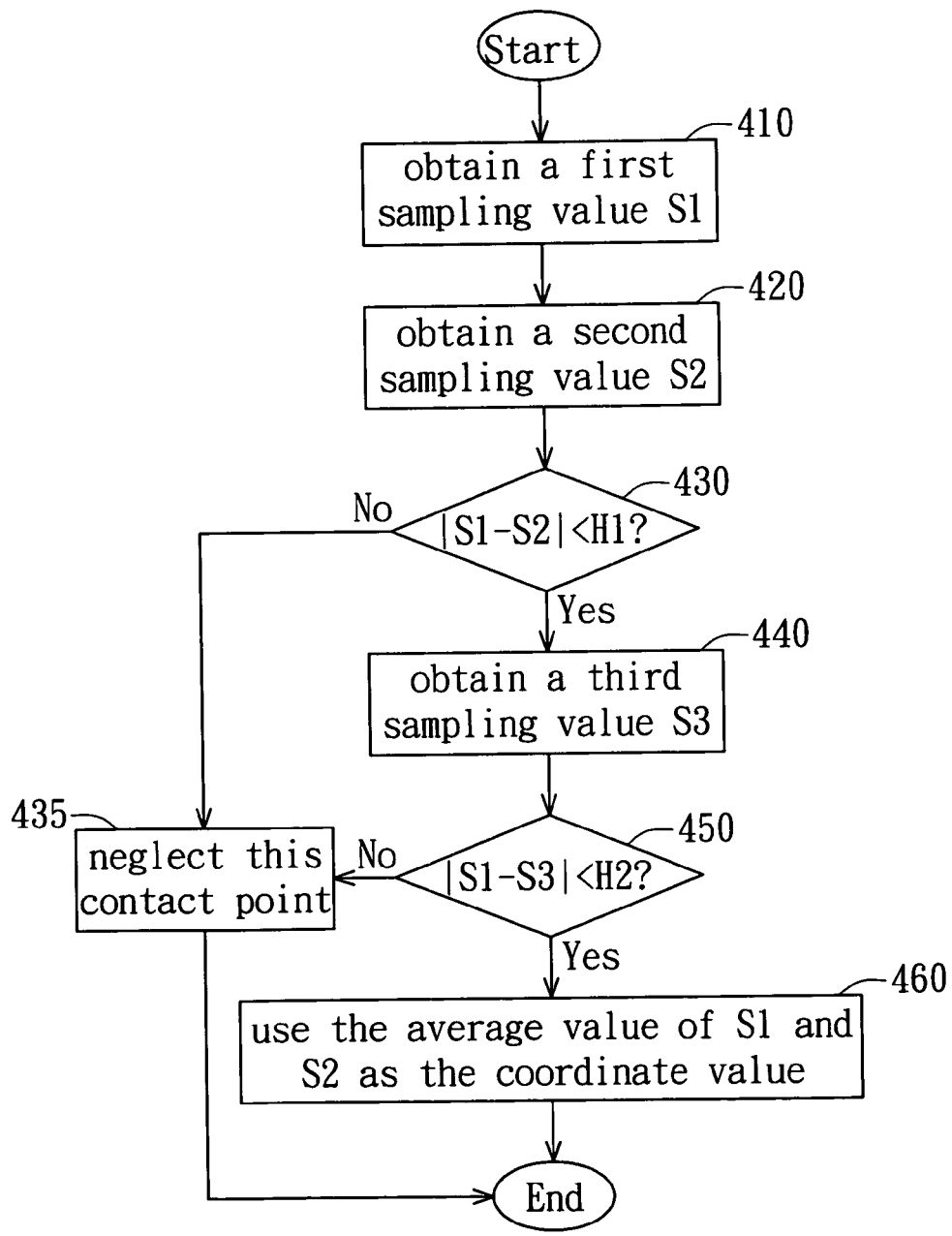
FIG. 4 is a flowchart of a positioning method according to a preferred embodiment of the invention.
Figure 5A:
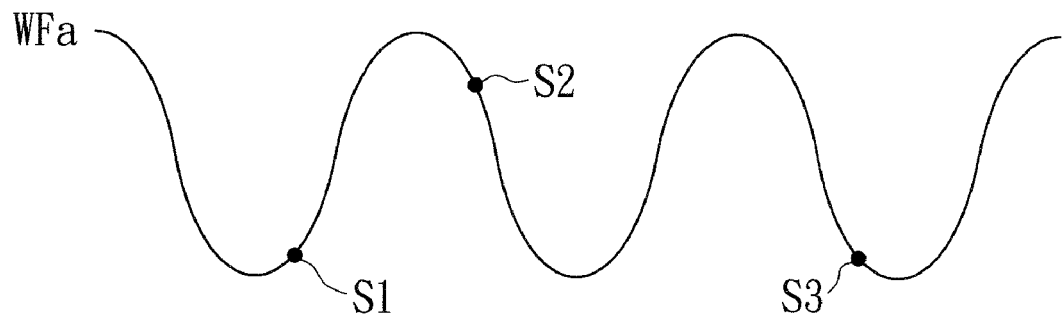
FIG. 5A and FIG. 5B are voltage diagrams for point XP.

Referring to FIG. 4 and FIG. 1, FIG. 4 shows a flowchart of a positioning method according to a preferred embodiment of the invention, and FIG. 1 shows a circuit diagram of a resistance-type film positioning device. Let T be the period of periodic noises. When detecting the X-coordinate or the Y-coordinate of a contact point, the voltage at point XP, point XM, point YP or point YM of the thin film positioning device 100 is sampled and measured. Here, point XP is used as an example of explanation. Having taken the voltage value of the sampled point XP, the ration between R_right and R_left will be obtained whereby the X-coordinate of the contact point can be referred. Referring to FIG. 5A, FIG. 5A shows a voltage waveform of point XP. In the FIG. 5A, the waveform of the voltage at point XP is indicated as WFa. Since the voltage at point XP is coupled to a periodic noise, the voltage at point XP will show a periodic pattern as well. Firstly, obtain a first sampling value S1 of the voltage at point XP at a first time point as shown in step 410. Next, obtain a second sampling value S2 of the voltage at point XP at a second time point as shown in step 420. The interval between the first time point and the second time point is substantially a half of the noise period T.

Figure 5B:
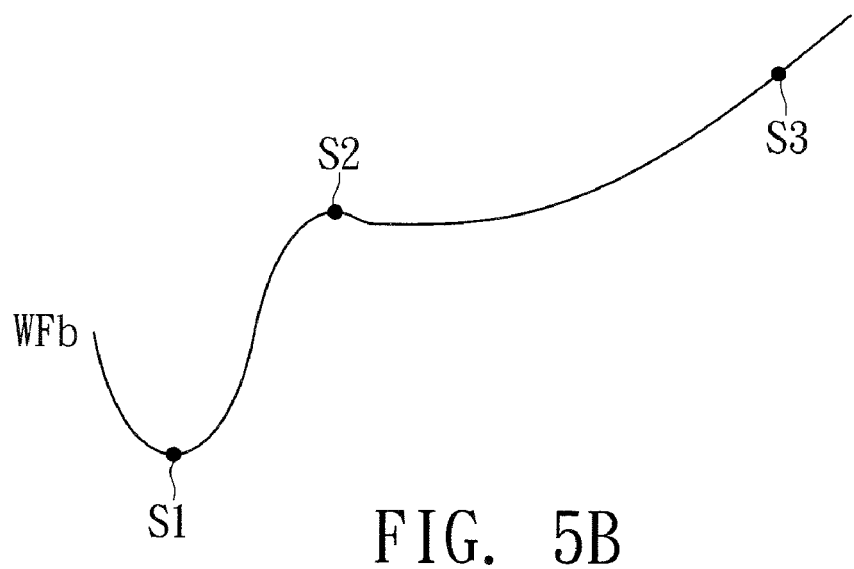

If the voltage at point XP shows a periodic pattern as that in FIG. 5A and further shows a moderate oscillation, then the average of the first sampling value S1 and the second sampling value S2 can be regarded as the voltage value of point XP. However, the voltage at point XP sometimes shows an irregular pattern due to the sudden change of the noise. Referring to FIG. 5B, another voltage waveform of point XP is shown. In the FIG. 5B, the waveform of the voltage at point XP is indicated as WFb. If this is the case, the average of the first sampling value S1 and the second sampling value S2 cannot be seen as the voltage value of point XP and a further check is required. Determine if the absolute value of the difference between the first sampling value S1 and the second sampling value S2 is smaller than a first threshold value H1 or not as shown in step 430: if not, proceed to step 435 and neglect the present contact point because the above samplings fail to represent the actual point touched by the user.

Figure 2A:
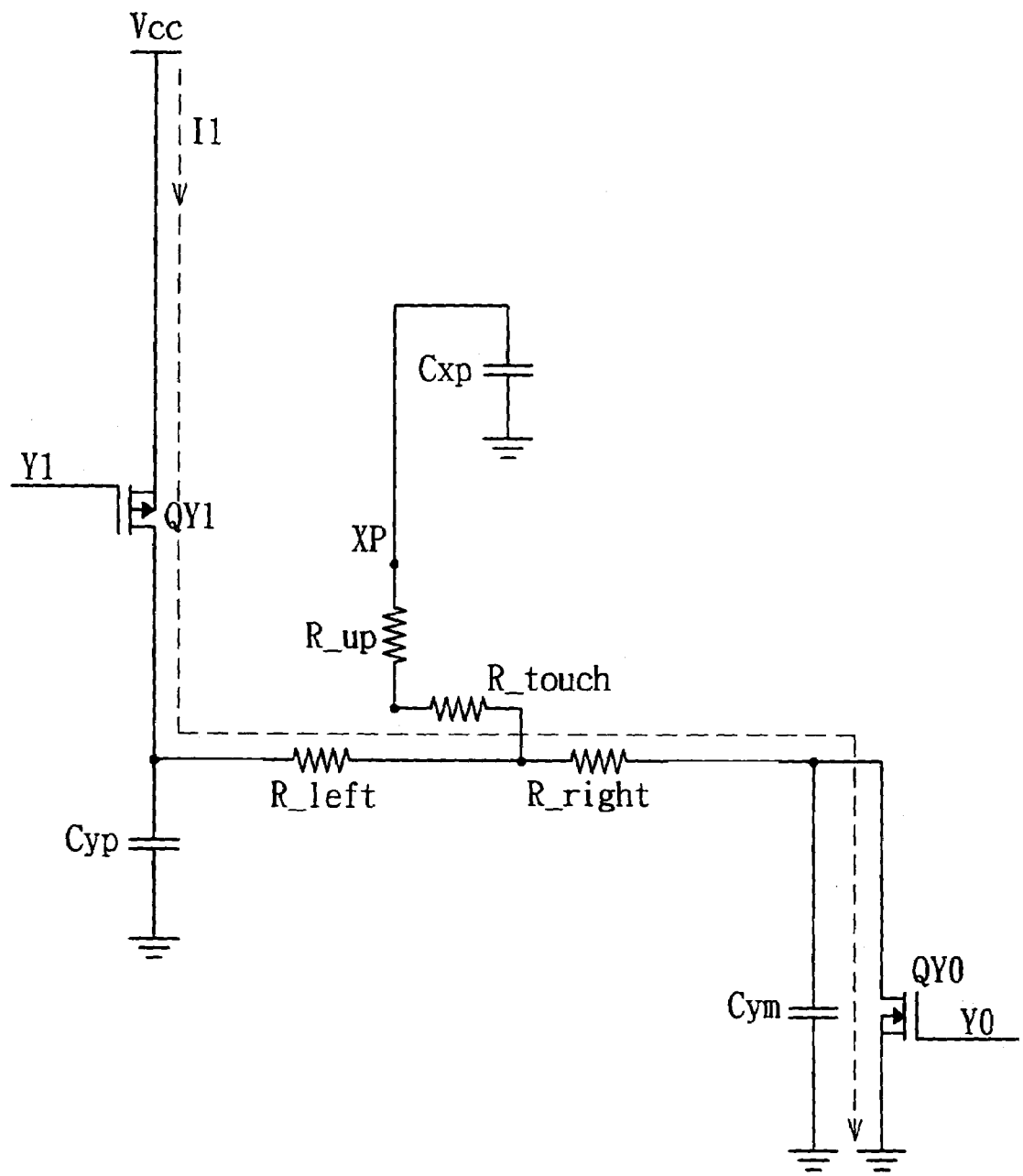
FIG. 2A is an equivalent circuit diagram for a thin film positioning device when detecting the X-coordinate of the contact.
Figure 2B:
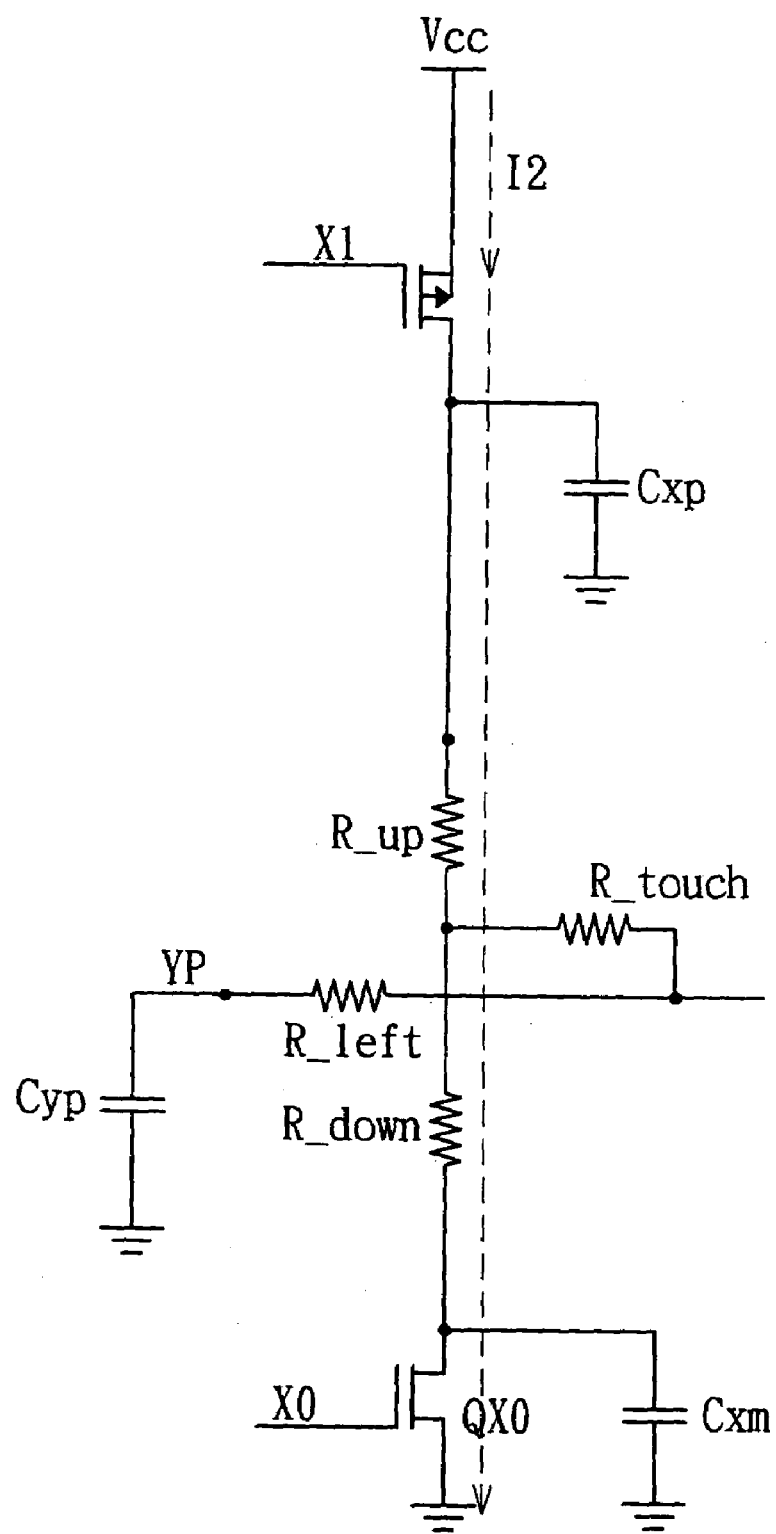
FIG. 2B is an equivalent circuit diagram for a thin film positioning device when detecting the Y-coordinate of the contact point.

Next, considering the voltage at point XP might surge up if the user applies too weak a force, so a further check is conducted in step 440. If the user applies too weak a force at the positioning device 100, the resistance at R_touch will surge up. Referring to FIG. 2A, if the electricity of capacitance Cxp has not been fully discharged, a small current will flow through R_touch causing the voltage at point XP to surge up as shown in FIG. 5B.

In step 440, a third sampling value S3 is obtained at a third time point. The interval between the first time point and the third time point is substantially a multiple of T, the period of the periodic noise. Next, proceed to step 450 to determine if the absolute value of the difference between the first and the third sampling values S1 and S3 is smaller than a second threshold value H2 or not: if yes, the average value of the first and the second sampling values S1 and S2 is used as the sampling value of point XP to obtain the X-coordinate of point XP accordingly; if not, proceed to step 435 and neglect the contact point. Theoretically, since the noise is periodic, the third sampling value S3 should be much the same as the sampling value S1 while threshold value H2 should be smaller than threshold value H1. However, if the user applies too weak a force at the positioning device 100, S3 will surge up as shown in FIG. 5B. If this is the case, this contact point should be neglected as if the user did not touch the positioning device at all.

The above disclosure uses the detection of the voltage at point XP as an example. However, the above procedures can also be applied to the detection of the voltage at points YP, YM, or XM as well. With only three samplings, the invention can promptly obtain the X-coordinate or the Y-coordinate of the contact point under an environment of periodic noises, avoiding the error of estimate due to the instant instability of the noise and due to too weak a force is applied at the contact point, thereby having the advantages of both promptness and preciseness.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A coordinate positioning method, which is applied in a thin film positioning device for detecting a coordinate value of a contact point under an environment of periodic noises, comprising the steps of:

obtaining a first sampling value of the contact point at a first time point;

obtaining a second sampling value of the contact point at a second time point, wherein the interval between the first time point and the second time point is substantially a half of the period of the periodic noise;

determining if an absolute value of the difference between the first sampling value and the second sampling value is smaller than a first threshold value or not: if not, neglecting this contact point and ending the process of this method;

obtaining a third sampling value of the contact point at a third time point, wherein the interval between the third time point and the first time point is substantially a multiple of the period of the periodic noise;

determining if an absolute value of the difference between the first sampling value and the third sampling value is smaller than a second threshold value or not: if not, neglecting this contact point and ending the process of this method; and using the average value of the first sampling value and the second sampling value to obtain the coordinate of the contact point.

2. The positioning method according to claim 1, wherein the first threshold value is larger than the second threshold value.

3. A coordinate positioning method, which is applied in a thin film positioning device for detecting a coordinate value of a contact point under an environment of periodic noises, comprising the steps of:
- obtaining a first sampling value of the contact point at a first time point;
- obtaining a second sampling value of the contact point at a second time point;
- determining if an absolute value of the difference between the first sampling value and the second sampling value is smaller than a first threshold value or not: if not, neglecting this contact point and ending the coordinate positioning method;
- obtaining a third sampling value of the contact point at a third time point;
- determining if an absolute value of the difference between the first sampling value and the third sampling value is smaller than a second threshold value or not: if not, neglect this contact point and end the process of this method; and
- using the average value of the first sampling value and the second sampling value to obtain the coordinate of the contact point.

4. The positioning method according to claim 3, wherein the first threshold value is larger than the second threshold value.

5. The positioning method according to claim 3, wherein the interval between the first time point and the second time point is substantially a half of the period of the periodic noise.

6. The positioning method according to claim 3, wherein the interval between the third time point and the first time point is substantially a multiple of the period of the periodic noise.

7. A coordinate positioning device for detecting a coordinate value of a contact point under an environment of periodic noise, comprising:
- a thin film X which has a first X-end and a second X-end
- a thin film Y which has a first Y-end and a second Y-end;
- a first switch Y coupled to the first Y-end and a ground end;
- a second switch Y coupled to the second Y-end and a power source;
- a first switch X coupled to the first X-end and the ground end;
- a second switch X coupled to the second X-end and the power source;
- wherein, if a sampling point is to be sampled by the positioning device, the sampling point is the first X-end, the second X-end, the first Y-end or the second Y-end; a first sampling value of the sampling point is obtained at a first time point while a second sampling value of the sampling point is obtained at a second time point, wherein the interval between the first time point and the second time point is substantially a half of the period of the periodic noise;
- wherein the coordinate positioning device determines if the absolute value of the difference between the first sampling value and the second sampling value is smaller than a first threshold value or not: if not, the coordinate positioning device neglects the contact point;
- wherein the coordinate positioning device obtains a third sampling value of the sampling point at a third time point, wherein the interval between the third time point and the first time point is substantially a multiple of the period of the periodic noise;
- wherein the coordinate positioning device determines if the absolute value of the difference between the first sampling value and the third sampling value is smaller than a second threshold value or not: if not, the coordinate positioning device neglects the contact point;
- wherein the positioning device uses the average value of the first sampling value and the second sampling value to obtain the coordinate value of the contact point.

8. The coordinate positioning device according to claim 7, wherein the first threshold value is larger than the second threshold value.

9. The coordinate positioning device according to claim 7, wherein the thin film X and the thin film Y are plane resistances.

10. The coordinate positioning device according to claim 7, wherein the first switch Y, the second switch Y, the first switch X, and the second switch X are transistors.

11. The coordinate positioning device according to claim 7, wherein when detecting an X-coordinate of the contact point, the coordinate positioning device connects the first switch Y and the second switch Y, then chooses a sampling point at the first X-end or at the second X-end to obtain the X-coordinate of the contact point accordingly.

12. The coordinate positioning device according to claim 7, wherein when detecting a Y-coordinate of the contact point, the coordinate positioning device connects the first switch X and the second switch X, then chooses a sampling point at the first Y-end or at the second Y-end to obtain the Y-coordinate of the contact point accordingly.

* * * * *